United States Patent [19]
Cullen et al.

[11] Patent Number: 5,322,701
[45] Date of Patent: Jun. 21, 1994

[54] CARBON DIOXIDE ABSORBENT PACKET AND PROCESS

[75] Inventors: John S. Cullen, Buffalo; Nicholas E. Vaylen, Grand Island, both of N.Y.

[73] Assignee: Multiform Desiccants, Inc., Buffalo, N.Y.

[21] Appl. No.: 4,786

[22] Filed: Jan. 14, 1993

Related U.S. Application Data

[63] Continuation of Ser. No. 624,517, Dec. 10, 1990, abandoned, which is a continuation of Ser. No. 448,234, Dec. 11, 1989, abandoned.

[51] Int. Cl.⁵ .............. B65B 55/00; B65D 81/00
[52] U.S. Cl. .................... 426/124; 426/118; 426/395; 426/398; 426/410; 423/230; 252/190; 252/192; 502/411; 502/400
[58] Field of Search .............. 426/124, 118, 395, 398; 502/411, 400; 423/230; 252/190, 192

[56] References Cited

U.S. PATENT DOCUMENTS

| | | | |
|---|---|---|---|
| 1,333,524 | 3/1920 | Wilson | 252/192 |
| 1,441,696 | 1/1923 | McNeil | 426/124 |
| 1,872,026 | 8/1932 | Carey | 252/192 |
| 2,322,206 | 6/1943 | Gardenier | 423/230 |
| 2,430,663 | 11/1947 | Behrman | 426/124 |
| 2,470,214 | 5/1949 | Egan | 252/192 |
| 2,470,214 | 5/1949 | Egan | 426/124 |
| 2,997,445 | 8/1961 | Nuhn | 252/192 |
| 3,489,693 | 1/1970 | Bovard | 423/230 |
| 3,519,384 | 7/1970 | Engel et al. | 423/230 |
| 3,557,011 | 1/1971 | Colombo et al. | 423/230 |
| 3,761,289 | 9/1973 | Wolf | 426/118 |
| 3,847,837 | 11/1974 | Boryta | 426/124 |
| 3,990,872 | 11/1976 | Cullen | 426/124 |
| 4,079,152 | 3/1978 | Bedrosian et al. | 426/124 |
| 4,166,807 | 9/1979 | Komatsu et al. | 426/124 |
| 4,192,773 | 3/1980 | Yoshikawa et al. | 426/124 |
| 4,366,179 | 12/1982 | Nawata et al. | 423/230 |
| 4,407,723 | 10/1983 | MacGregor | 252/192 |
| 4,552,767 | 11/1985 | Saleeb et al. | 426/395 |
| 4,579,223 | 4/1986 | Otsuka et al. | 426/124 |

FOREIGN PATENT DOCUMENTS

| | | | |
|---|---|---|---|
| 925056 | 4/1973 | Canada | 426/124 |
| 0192364 | 8/1986 | European Pat. Off. | 426/124 |
| 49-22391 | 2/1974 | Japan | 423/230 |
| 49-51189 | 5/1974 | Japan | 423/230 |
| 56-137847 | 10/1981 | Japan | 426/324 |
| 59-001375 | 1/1984 | Japan | 426/124 |
| 59-205942 | 11/1984 | Japan | 426/124 |
| 59-205944 | 11/1984 | Japan | 426/124 |
| 59-210844 | 11/1984 | Japan | 426/124 |
| 63-251045 | 10/1988 | Japan | 426/324 |
| 8701546 | 2/1989 | Netherlands | 426/124 |
| 709136 | 1/1980 | U.S.S.R. | |
| 7410 | of 1911 | United Kingdom | 426/118 |

*Primary Examiner*—Steven Weinstein
*Attorney, Agent, or Firm*—Joseph P. Gastel

[57] ABSTRACT

An absorbent packet for absorbing carbon dioxide at a rapid rate from a closed container, such as a package or can containing coffee and water vapor, including a porous envelope containing calcium oxide and a hydrating agent, such as silica gel with water adsorbed therein. The water vapor from the container permeates the envelope at a relatively rapid rate because of the affinity of silica gel for the water vapor in the container, and the silica gel becomes supersaturated and gives off water. The carbon dioxide from the environment also permeates the envelope because of its concentration outside of the envelope and because of the pressure gradient between the outside and inside of the envelope. The water given off by the supersaturated silica gel combines with the calcium oxide in the envelope to form calcium hydroxide. The carbon dioxide and the calcium hydroxide react to produce calcium carbonate and water. Any other suitable metal oxide may be used, including but not limited to the oxides of sodium, potassium, magnesium and barium. Also other hydrating agents may be used instead of silica gel.

20 Claims, 1 Drawing Sheet

CARBON DIOXIDE ABSORBENT PACKET AND PROCESS

This application is a continuation of application Ser. No. 07/624,517, filed Dec. 10, 1990, now abandoned, which is a continuation of Ser. No. 07/448,234, filed Dec. 11, 1989, now abandoned.

BACKGROUND OF THE INVENTION

The present invention relates to an improved absorbent packet and method for absorbing carbon dioxide gas within a sealed container which also contains water vapor.

By way of background, ground coffee is packaged in various types of containers including cans and metal foil packages. After sealing of such containers, carbon dioxide gas is generated within the container. This may cause the foil packages to balloon out, which is not only unsightly but also prevents the containers from being stacked properly. Also the carbon dioxide can build up pressure in cans so that there can be a quick release of pressure in the nature of a slight explosion when the can is opened. Additionally, the carbon dioxide deleteriously affects the taste of the coffee.

SUMMARY OF THE INVENTION

It is one important object of the present invention to provide an absorbent packet for placement in a container in which carbon dioxide gas is generated for the purpose of rapidly absorbing such gas.

Another object of the present invention is to provide an improved method for absorbing carbon dioxide gas within a container which also contains moisture, with the resulting reaction product being confined entirely within a packet in which the absorbent was located. Other objects and attendant advantages of the present invention will readily be perceived hereafter.

The present invention relates to an absorbent for carbon dioxide gas for use in an environment also containing water comprising a porous envelope, a metal oxide in said envelope, and a hydrating agent containing water in said envelope.

The present invention also relates to a method of absorbing carbon dioxide gas from a container which contains coffee which generates carbon dioxide and which also contains water vapor comprising the steps of placing a metal oxide into a vapor permeable envelope, placing a hydrating agent containing water into said envelope, sealing said envelope, and placing said envelope into said container of coffee to cause said water vapor in said container to permeate said envelope as a result of being drawn thereinto by the affinity of said hydrating agent therefor, said hydrating agent giving off liquid water into said envelope to cause said oxide to form an hydroxide, and said carbon dioxide which permeates said envelope combining with said hydroxide to form a carbonate and water in said envelope.

The present invention also relates to the combination of an expandible flexible package containing water vapor and coffee which releases carbon dioxide gas which increases the pressure in said package tending to cause it to expand, and an absorbent unit which tends to prevent an increase in said pressure from said released carbon dioxide gas comprising an envelope of sheet material permeable to said carbon dioxide gas and water vapor, a metal oxide in said envelope, and a hydrating agent containing water in said envelope for attracting water vapor from said package and giving off water within said envelope which combines with said oxide to form a hydroxide, and said carbon dioxide and said hydroxide combining to form a carbonate and water to thereby effectively absorb said carbon dioxide to prevent said tendency to increase said pressure and also retain said carbonate in said envelope.

The various aspects of the present invention will be more fully understood when the following portions of the specification are read in conjunction with the accompanying drawings wherein:

DESCRIPTION OF THE PREFERRED EMBODIMENTS

Figure 1:
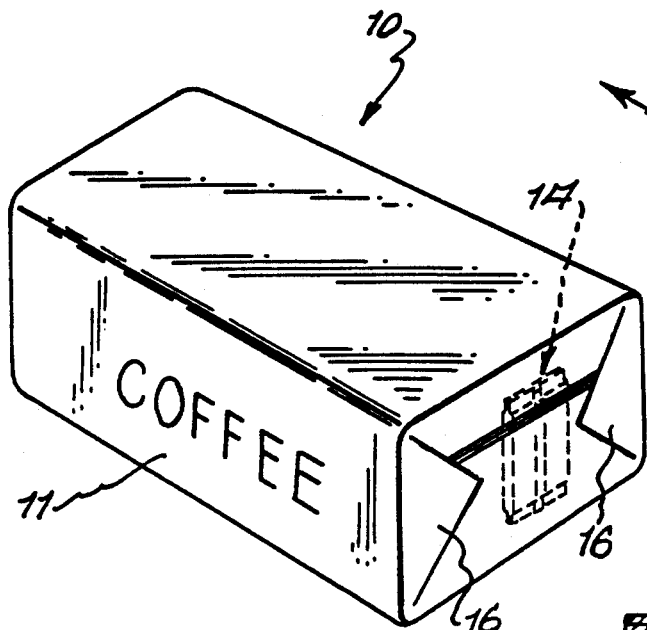
FIG. 1 is a side elevational view of a prior art coffee container in a flexible container in which carbon dioxide has been generated.
Figure 2:
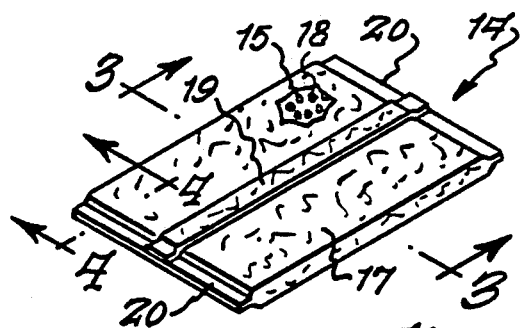
FIG. 2 is a perspective view of the packet for absorbing carbon dioxide gas and water vapor within a container such as shown in FIG. 1.
Figure 3:
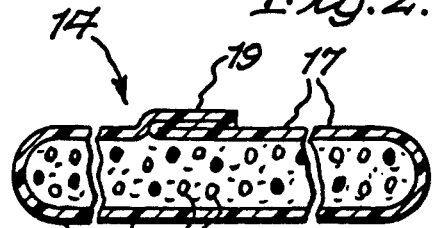
FIG. 3 is a fragmentary cross sectional view taken substantially along line 3—3 of FIG. 2.
Figure 4:
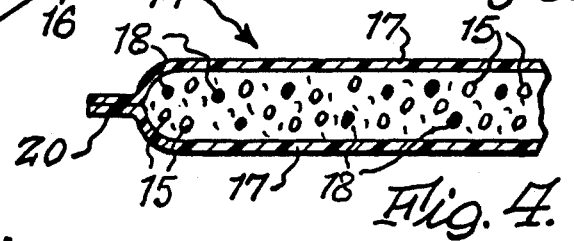
FIG. 4 is a fragmentary cross sectional view taken substantially along line 4—4 of FIG. 2.

By way of background, coffee container 10 is fabricated of flexible metal foil material which is impervious to liquid. Container 10 includes a tubular central section 11 and ends 16 which are folded over to seal the container. After the container 10 has been filled with coffee and sealed, coffee within container 10 generates carbon dioxide gas which increases the pressure within the container and which may cause it to balloon out. This is not only unsightly, but it prevents containers from being stacked properly. In addition, the carbon dioxide deleteriously affects the flavor of the coffee. Container 10 is generally sealed in such a manner so that it retains a vacuum therein. However, when sufficient carbon dioxide gas is released by the coffee, the effect of the vacuum can be overcome to cause the above-mentioned ballooning.

In accordance with a preferred embodiment of the present invention a packet 14 containing a mixture of calcium oxide powder 15 and silica gel containing water 18 is placed within the container 10 prior to the sealing operation. It is the silica gel with water which hastens the adsorption of carbon dioxide, as explained in greater detail hereafter.

Absorbent packet 14 includes an envelope 17 which will pass gases and water vapor, but not liquid water. Thus, the liquid water in the silica gel cannot come in contact with the coffee. Envelope 17 is preferably fabricated from planar sheet material known under the trademark TYVEK ® which is a spun-bonded polyolefin product. The packet 17 is heat-sealed along longitudinal seam 19 and along end seams 20 to confine the calcium oxide powder 15 and silica gel containing water 18 therein. Any other suitable manner of forming the seams may be used. The specific TYVEK ® which was used is known as Style 1059B. The exact grade can depend on the rate of adsorption which is desired. Calcium oxide flows well, and thus it is good from a viewpoint of manufacturing the packets 14.

The contents of container 10, after sealing in the above-described manner, include ground coffee, a certain amount of water vapor and, after a period of time, carbon dioxide which is generated by the coffee. The following actions and chemical reactions occur: The water vapor from container 10 is drawn into envelope 17 because of the great affinity of silica gel for water, and it is this action which hastens the absorption of carbon dioxide by supplying water for the necessary reactions. In this respect, the silica gel becomes supersaturated and gives off liquid water within the envelope. The carbon dioxide also penetrates the envelope 17 because it becomes concentrated outside of envelope 17, and thus creates a pressure gradient wherein the higher pressure carbon dioxide is caused to enter the envelope. The water given off by the silica gel reacts with the calcium oxide to produce calcium hydroxide in accordance with the following reaction:

$$CaO + H_2O \rightarrow Ca(OH)_2 \quad (1)$$

Thereafter the calcium hydroxide and carbon dioxide react within envelope 17 to yield calcium carbonate and water according to the following reaction:

$$Ca(OH)_2 + CO_2 \rightarrow CaCO_3 + H_2O \quad (2)$$

The water which is formed in accordance with reaction (2) within envelope 17 will be in both the liquid and gaseous phase, and when the vapor pressure within envelope 17 reaches a predetermined value, which is greater than the vapor pressure outside of envelope 17, the water vapor may pass out of envelope 17 and back into container 10. Thus, the absorbent packet 14 will not unduly desiccate the product.

It is to be especially noted that the calcium carbonate is formed in situ within envelope 17 and thus will not mix with the coffee 21 within container 10. The envelope 17 containing the calcium carbonate can be thrown away after the coffee package has been opened.

In preparing the ingredients of the packet 10 the following procedure is followed. First of all, a proper amount of water is simply mixed with the required amount of silica gel or other hydrating agent. Thereafter, a batch of silica gel containing water is mixed with the proper amount of calcium oxide, and a proper amount of the resulting mixture is placed into each packet.

While calcium oxide has been used as the absorbent powder 15, it will be appreciated that magnesium oxide and barium oxide may also be used, but that the calcium oxide is preferred. The reactions with magnesium and barium are analogous to those with calcium, as indicated above.

Also, potassium oxide ($K_2O$) and sodium oxide ($Na_2O$) can be used. The reactions are analogous to those for calcium oxide, as shown above in steps (1) and (2), and the ultimate reaction products, sodium carbonate and potassium carbonate are retained within the envelope, while water can pass therethrough, as explained above, to limit desiccation of the food product. The reactions are:

$$Na_2O + H_2O \rightarrow 2Na(OH)$$

or $$K_2O + H_2O \rightarrow 2K(OH)$$

Thereafter the hydroxides combine with the $CO_2$ as follows:

$$2NaOH + CO_2 \rightarrow Na_2CO_3 + H_2O$$

or $$2KOH + CO_2 \rightarrow K_2CO_3 + H_2O.$$

In addition, any suitable metal oxide can be combined with the water-containing hydrating agent to absorb carbon dioxide from the environment as long as its electronegativity is less than oxygen. By way of example and not of limitation, the oxides of iron, manganese, nickel, chromium, zinc and aluminum can be used, and those having a valence of plus two will provide reactions which are analogous to that shown above for calcium.

In the above composition containing calcium oxide, the latter can be present by weight in an amount of between about 40% and 80%, and more preferably between about 50% and 70%, and most, preferably between about 57% and 63%; the silica gel can be present by weight in an amount of between about 20% and 60%, and more preferably between about 30% and 50%, and most preferably between about 38% and 42%; and water may be present by weight in an amount of between about 5% and 36% of the silica gel, and more preferably between about 25% and 36% of the silica gel, and most preferably about 36% of the silica. The weights of sodium oxide, potassium oxide, magnesium oxide, barium oxide, or of any other metal oxide in compositions containing silica gel and water would vary according to their stochiometric reactant proportions.

A packet which is 1¼ inches wide and 2 inches long and about ¼ inch thick containing 5 grams of total weight of material with 60% by weight of calcium oxide and 40% by weight of silica gel and containing 36% by weight of water has been inserted into a 13 oz. cylindrical metal coffee can containing 13 ounces of fresh ground coffee having inherent moisture therein. The coffee can was sealed but the coffee was not vacuum packed. Satisfactory absorption of carbon dioxide was effected because the sealed container did not balloon out within the normal period during which ballooning should have occurred. The calcium oxide was 40 mesh and the silica gel was 30×200 mesh. However, the mesh sizes may vary, as the foregoing sizes are not critical.

It is to be especially noted that attempting to mix calcium oxide and carbon dioxide directly will not result in the formation of calcium carbonate. The same is true of the other oxides discussed above. There must be water present so that the reaction can occur in the steps listed above. The affinity of the hydrating agent, silica gel, for water from container 10 hastens the above reactions because it supplies water therefor.

While the above-discussed silica gel is a preferred hydrating agent, it will be appreciated that other hydrating agents can be used, and such agents may be by way of example and not of limitation, clay, molecular sieve, vermiculite, activated carbon and diatomaceous earth.

While the above description was made relative to a specific application, namely, ground coffee, it will be appreciated that the carbon dioxide absorbing packet and method can be used in other environments where carbon dioxide is to be absorbed.

While the envelope 17 has been described above as impermeable to liquid water, under certain circumstances this characteristic may not be necessary, and thus it may be permeable to liquid water. Also while envelope 17, as described above, does not dissolve, in other circumstances it may not be objectionable for the packet to dissolve and thus discharge its contents into the material in which it is located.

Figure 5:
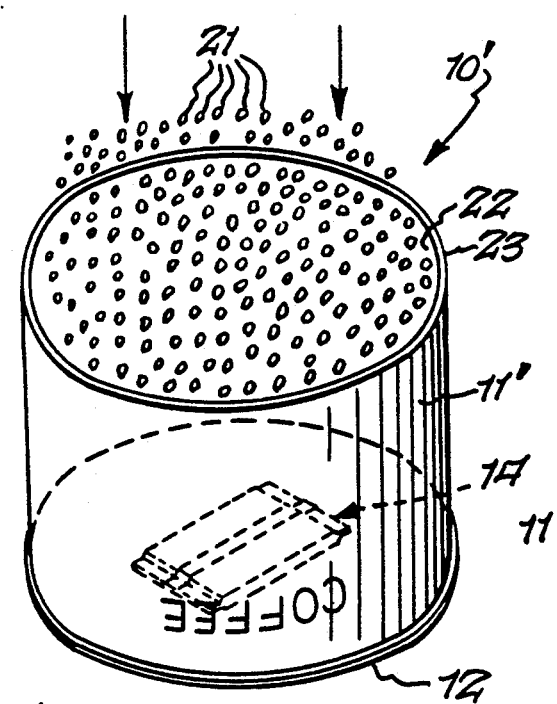
FIG. 5 is a view showing the manner in which the absorbent packet may be placed in a coffee can before it is filled with coffee.
Figure 6:
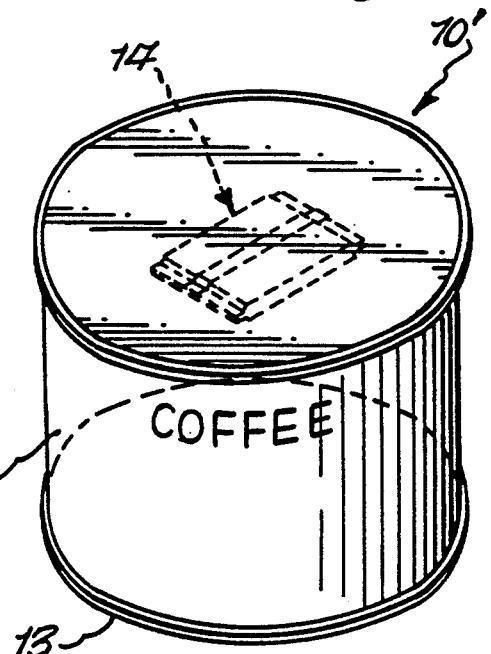
FIG. 6 is a view of the coffee can after it has been completely sealed.

In FIGS. 5 and 6, one procedure for inserting a packet 14 into a conventional metal coffee can 11' is shown. A packet 14 may be dripped into an inverted can which has its top 12 secured thereto. Thereafter, the coffee is filled into can 11' through its open bottom. Thereafter, metal bottom 22 is suitably fastened to bottom edge 23 in fluid-tight relationship. Thereafter, when coffee can 11' is inverted to an upright position, packet 14 will be lying on the coffee, and it can be removed after can top 22 has been removed. Also, it may be desirable to leave packet 14 in the can to continue absorbing carbon dioxide, in the event that the coffee is to be stored for a relatively long time. Under certain circumstances it may be desirable to insert the packet 14 so that it is located at the bottom of an upright can, and thus it will definitely remain in the can during the removal of the coffee.

While preferred embodiments of the present invention have been disclosed, it will be appreciated that it is not limited thereto but may be otherwise embodied within the scope of the following claims.

What is claimed is:

1. In combination, a container containing water vapor, a product in said container which releases carbon dioxide gas, and an absorbent unit in said container which absorbs said released carbon dioxide gas from said container, said absorbent unit comprising an envelope of sheet material permeable to said carbon dioxide gas and water vapor, a mixture of a flowable particulate metal oxide and a hydrating agent in said envelope, said flowable particulate metal oxide being capable of reacting with liquid water to form a metal hydroxide which in turn is capable of reacting with carbon dioxide gas to form a carbonate and water thus removing carbon dioxide gas from said container, said hydrating agent containing an amount of adsorbed liquid water in said envelope, said hydrating agent having an affinity for said water vapor, said liquid water in said hydrating agent being present at the time of inserting said envelope into said container in an initial amount of at least 5% of the weight of said hydrating agent but less than the supersaturation amount thereof, said hydrating agent containing said liquid water being present in said envelope in an amount such that it is capable of adsorbing a sufficient amount of said water vapor to become supersaturated to release water to cause said metal oxide to be converted to said metal hydroxide to combine with said carbon dioxide to form said carbonate and water, said presence of said initial amount of liquid water in said hydrating agent lessening the amount of water vapor required for said hydrating agent to reach supersaturation, and said metal oxide and said hydrating agent being present in amounts sufficient to absorb released carbon dioxide gas from said container to substantially prevent carbon dioxide gas buildup in said container.

2. The combination as set forth in claim 1 wherein said metal oxide is selected from the group consisting of calcium, barium, magnesium, sodium and potassium oxides.

3. The combination as set forth in claim 1 wherein said envelope of sheet material is impermeable to liquid water.

4. The combination as set forth in claim 3 wherein said metal oxide is selected from the group consisting of calcium, barium, magnesium, sodium, potassium, iron, manganese, chromium, nickel, copper, zinc and aluminum oxides.

5. The combination as set forth in claim 1 wherein said hydrating agent is silica gel.

6. The combination as set forth in claim 5 wherein said metal oxide is calcium oxide.

7. The combination as set forth in claim 1 wherein said metal oxide is calcium oxide.

8. The combination as set forth in claim 1 wherein said product is coffee, and wherein said envelope of sheet material is impervious to liquid water.

9. The combination as set forth in claim 1 wherein said container is an expandible flexible package, and wherein said product is coffee, and wherein said carbonate is retained in said envelope after it is formed.

10. The combination as set forth in claim 1 wherein said metal oxide is calcium oxide which is present by weight in an amount of between about 40% and 80%, and wherein said hydrating agent is silica gel which is present by weight in an amount of between about 20% and 60%, and wherein said water is present by weight in said silica gel in an amount of between about 5% and 36% of said silica gel.

11. The combination as set forth in claim 1 wherein said metal oxide is calcium oxide which is present by weight in an amount of between about 50% and 70%, and wherein said hydrating agent is silica gel which is present by weight in an amount of between about 30% and 50%, and wherein said water is present by weight in said silica gel in an amount of between about 5% and 36% of said silica gel.

12. The combination as set forth in claim 1 wherein said container is an expandible flexible package.

13. A method of absorbing carbon dioxide gas from a sealed container which contains water vapor and which contains coffee which generates carbon dioxide, said method tending to prevent an increase in gas pressure within said container resulting from the pressure produced by the released carbon dioxide comprising the steps of sealing a mixture of a flowable metal oxide and a hydrating agent containing an amount of adsorbed liquid water within an envelope which is permeable to said water vapor and said carbon dioxide and impermeable to said liquid water within said envelope, inserting said coffee into said container, inserting said sealed envelope into said container, and sealing said container with said envelope and said coffee therein, said liquid water in said hydrating agent being present at the time of inserting said envelope into said container in an initial amount of at least 5% of the weight of said hydrating agent but less than the supersaturation amount thereof, said hydrating agent having an affinity for said water vapor in said sealed container, said hydrating agent containing said liquid water being present in said envelope in an amount such that it is capable of adsorbing a sufficient amount of said water vapor from aid sealed container to become supersaturated to release water, said presence of said liquid water in said hydrating agent significantly lessening the amount of water vapor required for said hydrating agent to reach supersaturation, said water vapor from said sealed container being drawn into said envelope by said hydrating agent which has an affinity therefor to thus give off water within said envelope which remains in said envelope so as not to contact said coffee, said water within said envelope combining with said oxide within said envelope to thus form an hydroxide, said carbon dioxide passing into said envelope and combining with said hydroxide in said envelope to form water and a carbonate which are retained therein, thereby being maintained separate from said coffee contained in said container, and said metal oxide and said hydrating agent being present in amounts sufficient to adsorb released carbon dioxide gas from said container to substantially prevent carbon dioxide gas buildup in said container.

14. A method as set forth in claim 13 wherein said metal oxide is selected from the group consisting of calcium, barium, magnesium, sodium, potassium, iron, manganese, chromium, nickel, copper, zinc and aluminum oxides.

15. The method as set forth in claim 13 wherein said closed container is an expandible flexible package.

16. The method as set forth in claim 13 wherein said metal oxide is calcium oxide, and wherein said hydrating agent is silica gel.

17. The method as set forth in claim 13 wherein said hydrating agent is calcium oxide.

18. The method as set forth in claim 17 wherein said calcium oxide is present by weight in an amount of between about 40% and 80%, and wherein said hydrating agent is silica gel which is present by weight in an amount of between about 20% and 60%, and wherein said water is present by weight in said silica gel in an amount of between about 5% and 36% of said silica gel.

19. The method as set forth in claim 13 wherein said closed container is an expandible flexible package, and wherein said metal oxide is calcium oxide, and wherein said hydrating agent is silica gel, and wherein said calcium oxide is present by weight in an amount of between about 20% and 80%, and wherein said silica gel is present by weight in an amount of between about 20% and 60%, and wherein said water is present by weight in said silica gel in an amount of between about 5% and 36% of said silica gel.

20. The method as set forth in claim 19 wherein said calcium oxide is present by weight in an amount of between about 50% and 70%, and wherein said silica gel is present by weight in an amount of between about 50% and 30%.

* * * * *

UNITED STATES PATENT AND TRADEMARK OFFICE
CERTIFICATE OF CORRECTION

PATENT NO. : 5,322,701
DATED : June 21, 1994
INVENTOR(S) : John S. Cullen et al

It is certified that error appears in the above-indentified patent and that said Letters Patent is hereby corrected as shown below:

Column 4, line 25, after "most" cancel the ",";

line 33, after "silica" (second occurrence) insert --gel--;

line 67, change "diatomaccous" to --diatomaceous--.

Column 5, line 16, change "dripped" to --dropped--.

Column 6, line 66 (claim 13), change "aid" to --said--.

Signed and Sealed this

Thirtieth Day of August, 1994

Attest:

BRUCE LEHMAN

Attesting Officer

Commissioner of Patents and Trademarks